(12) United States Patent
Ito

(10) Patent No.: US 11,789,391 B2
(45) Date of Patent: Oct. 17, 2023

(54) IMAGE FORMING APPARATUS

(71) Applicant: KYOCERA Document Solutions Inc., Osaka (JP)

(72) Inventor: Shigeharu Ito, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 17/991,965

(22) Filed: Nov. 22, 2022

(65) Prior Publication Data

US 2023/0168618 A1 Jun. 1, 2023

(30) Foreign Application Priority Data

Nov. 30, 2021 (JP) ................................. 2021-193971

(51) Int. Cl.
*G03G 15/00* (2006.01)
(52) U.S. Cl.
CPC ................................ *G03G 15/5016* (2013.01)
(58) Field of Classification Search
CPC ............... G03G 15/50; G03G 15/5004; G03G 15/5008; G03G 15/5012; G03G 15/5016
See application file for complete search history.

(56) References Cited

U.S. PATENT DOCUMENTS

2008/0246989 A1* 10/2008 Konuma ............ G03G 15/5016
358/1.15
2011/0013924 A1* 1/2011 Hosoi .................. G03G 21/206
399/83
2017/0336744 A1* 11/2017 Noda ................. G03G 15/5016

FOREIGN PATENT DOCUMENTS

JP 2011-22377 A 2/2011

* cited by examiner

*Primary Examiner* — Hoang X Ngo
(74) *Attorney, Agent, or Firm* — Stein IP, LLC

(57) ABSTRACT

An image forming apparatus includes a conveyance portion, a printing portion, a delay storage portion, a control portion, an input portion, and a display portion. The delay storage portion can store delay information. The control portion performs a measurement mode. The input portion receives instructions to start and end the measurement mode. When an instruction to perform the measurement mode is entered, the control portion deletes the delay information stored in the delay storage portion and stores the delay information generated thereafter during printing in the delay storage portion. When an instruction to end the measurement mode is entered, the control portion displays on the display portion delay information on predetermined irregular delay factors that occur irregularly during printing, out of the delay information stored in the delay storage portion.

7 Claims, 3 Drawing Sheets

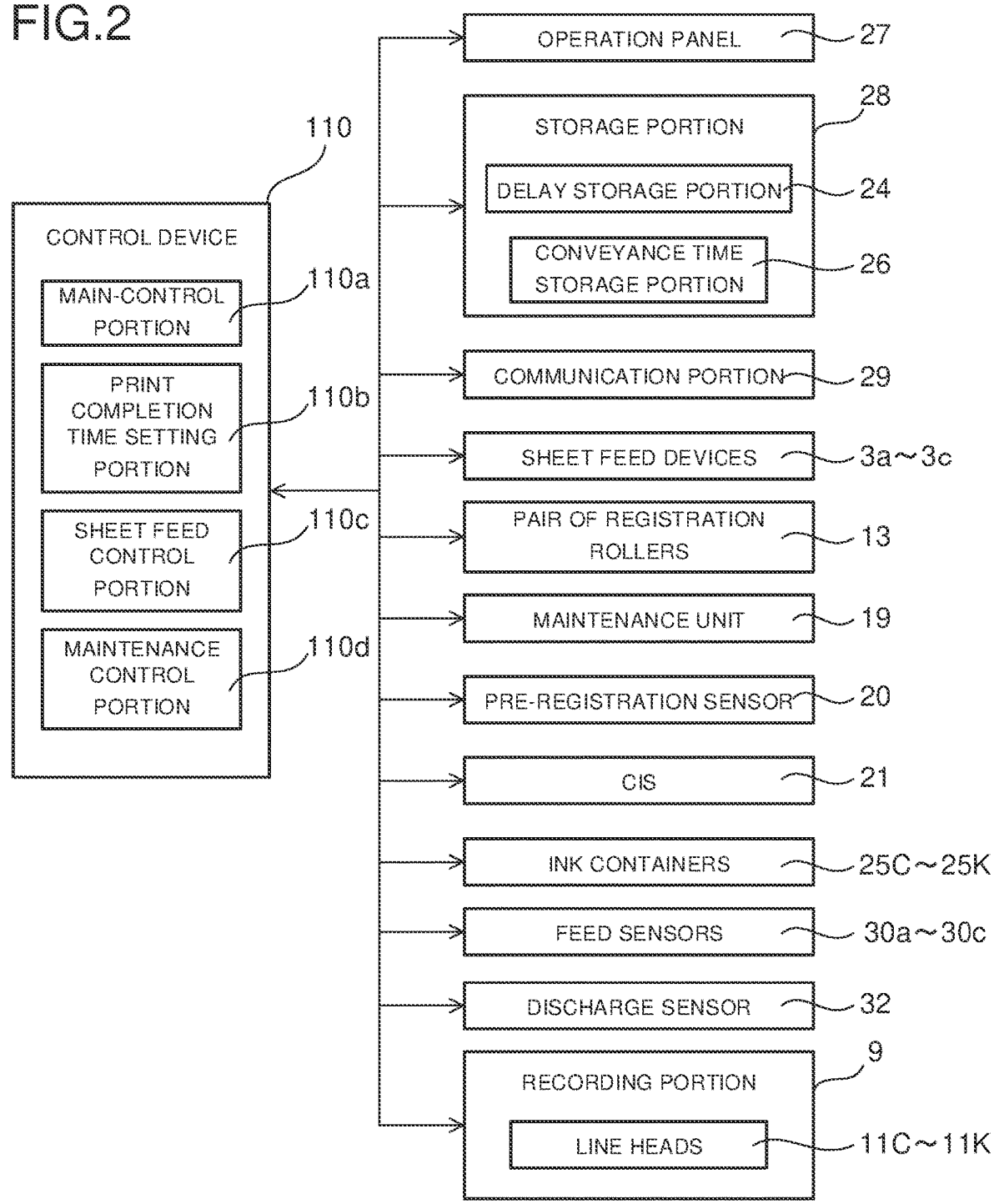

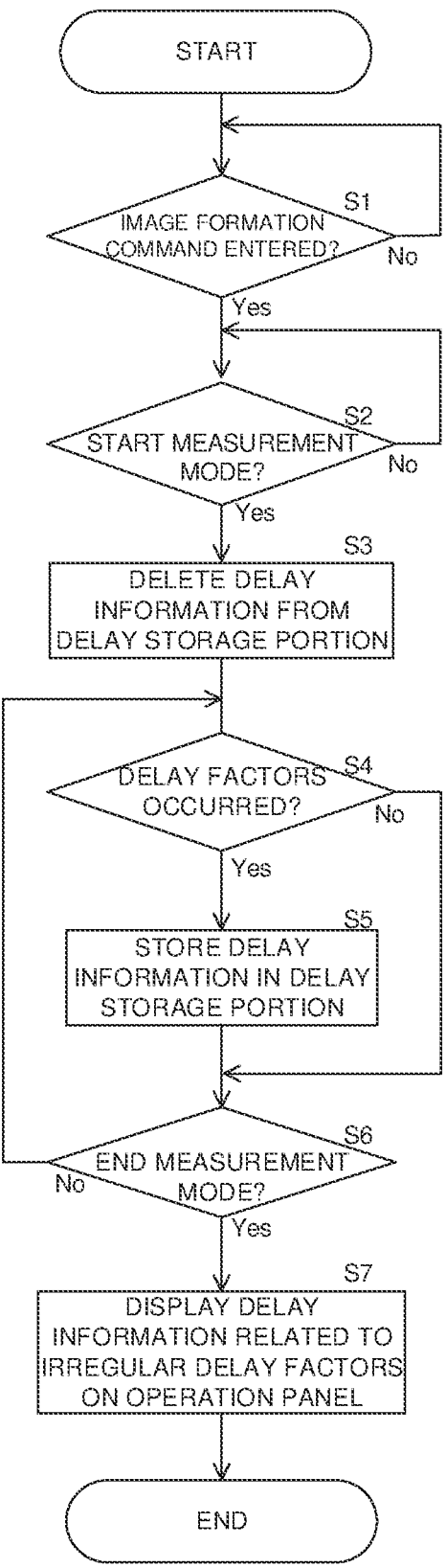

IMAGE FORMING APPARATUS

This application is based on and claims the benefit of priority from Japanese Patent Application No. 2021-493971 filed on Nov. 30, 2021, the contents of which are hereby incorporated by reference.

BACKGROUND

The present disclosure relates to an image forming apparatus.

Image forming apparatuses vary in the amount of time that they require for printing depending on print settings and the type of recording medium (sheets, envelopes, and the like). For example, when printing is performed on different types of recording media in a single session of printing, while sheet feed sources are switched appropriately among multiple storage portions where different types of recording media are stored, recording media are fed to a conveyance portion. Then a delay occurs in sheet feeding every time the storage portions as the sheet feed sources are switched, and this leads to a delay in printing.

On the other hand, there are image forming apparatuses which read the timing and the number of times of switching storage portions from printing information entered on a host device such as a PC or through an operation portion (an input portion) on an image forming apparatus and which displays them on a display portion. With such image forming apparatuses, the user can predict delay information on printing in advance from what is displayed on the display portion.

SUMMARY

An image forming apparatus according to one aspect of the present disclosure includes a conveyance portion, a printing portion, a delay storage portion, a control portion, an input portion, and a display portion. The conveyance portion conveys a recording medium. The printing portion performs printing on the recording medium conveyed by the conveyance portion. The delay storage portion can store delay information including a delay factor which causes a delay during printing. The control portion performs a measurement mode to store the delay information in the delay storage portion when the delay factor occurs. The input portion receives instructions to start and end the measurement mode. The display portion displays the delay information. When an instruction to perform the measurement mode is entered, the control portion deletes the delay information stored in the delay storage portion and stores the delay information generated thereafter during printing in the delay storage portion. When an instruction to end the measurement mode is entered, the control portion displays on the display portion the delay information on predetermined irregular delay factors that occur irregularly during printing, out of the delay information stored in the delay storage portion.

BRIEF DESCRIPTION OF THE DRAWINGS

FIG. 2 is a block diagram showing one example of control paths in the printer according to the embodiment.

FIG. 3 is a flow chart showing one example of a control flow for a measurement mode.

DETAILED DESCRIPTION

Figure 1:
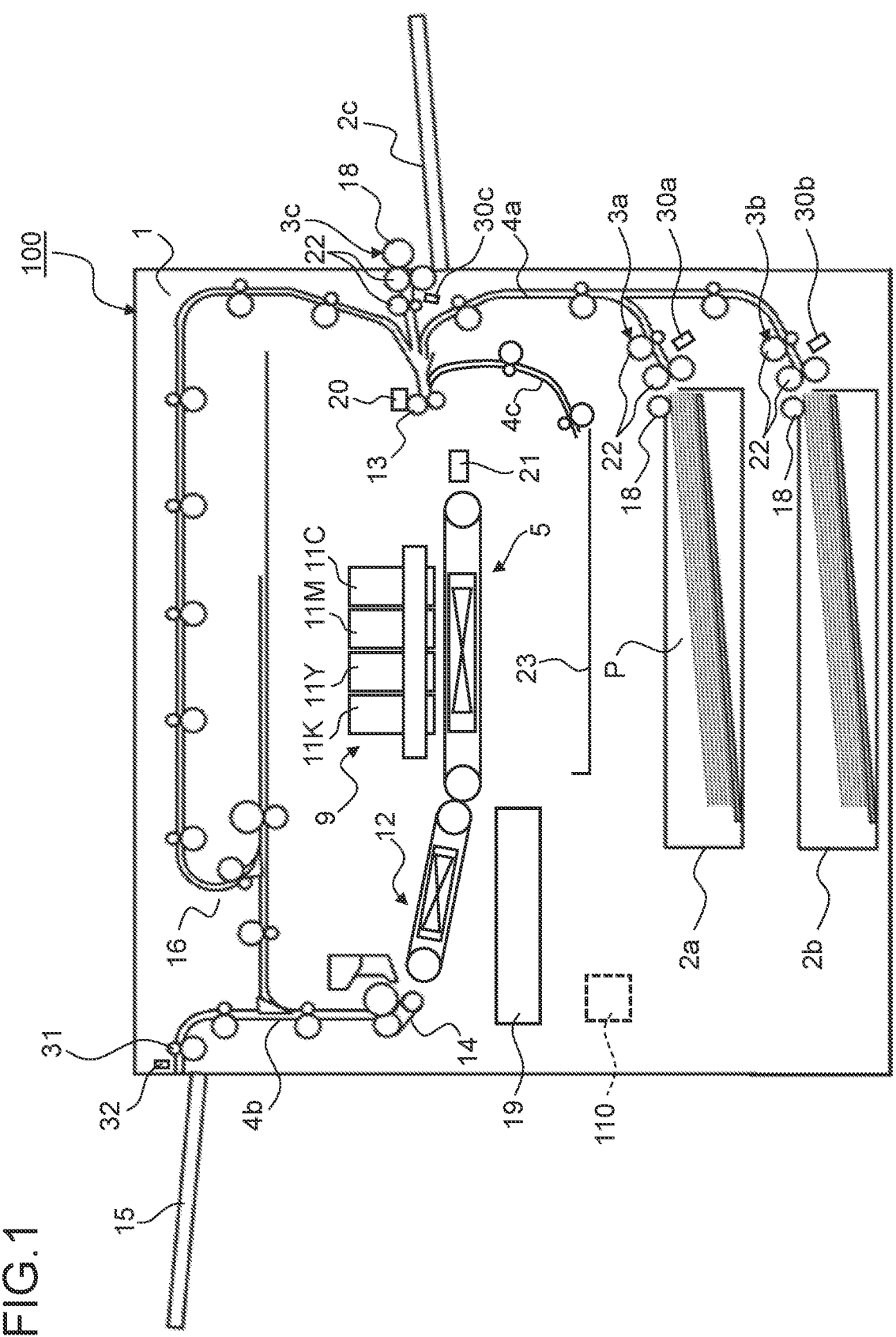
FIG. 1 is a diagram showing a schematic configuration of an inkjet recording printer according to an embodiment of the present disclosure.

Hereinafter, an embodiment of the present disclosure will be described with reference to the drawings. FIG. 1 is a diagram showing a schematic configuration of an inkjet recording printer 100 (image forming apparatus) according to the embodiment of the present disclosure.

As shown in FIG. 1 the printer 100 includes sheet feed cassettes 2a and 2b (recording medium storing portion) and a manual sheet feed tray 2c (recording medium storing portion). The sheet feed cassettes 2a and 2b can store sheets P (recording medium which can be printing paper, envelopes, or the like) inside. The sheet feed cassettes 2a and 2b are provided in a lower part inside a primer main body 1.

Sheets P can be placed on the top face of the manual sheet feed tray 2c. The manual sheet feed tray 2c is provided on the right side of the printer main body 1, outside it. Hereinafter, the direction in which a sheet P is conveyed from the sheet feed cassettes 2a or 2b or the manual sheet feed tray 2c is referred to as the "sheet conveyance direction". The side at which the sheet feed cassette 2a and 2b and the manual sheet feed tray 2c are located is referred to as the upstream side in the sheet feed direction and the opposite side is referred to as the downstream side.

Downstream of the sheet feed cassettes 2a and 2b in the sheet conveyance direction, that is, at the upper right side of each of the sheet feed cassettes 2a and 2b in FIG. 1, a sheet feed device (recording medium feeding portion) 3a or 3b is disposed. Downstream of the manual sheet feed tray 2c in the sheet conveyance direction, that is, at the left side of the manual sheet feed tray 2c in FIG. 1, a sheet feed device 3c is disposed. By the sheet feed devices 3a to 3c, sheets (recording medium) P are separated and fed out one by one.

Inside the printer 100, a first sheet conveyance passage 4a (conveyance portion) is provided. An upstream end part of the first sheet conveyance passage 4a in the sheet conveyance direction is connected to the sheet feed cassettes 2a and 2b via the sheet feed devices 3a and 3b. The first sheet conveyance direction 4a extends upwards from an upstream end part of it in the sheet conveyance direction along a side face of the primer main body 1. The manual sheet feed tray 2c is connected to the first sheet conveyance passage 4a via the sheet feed device 3c. The sheet feed devices 3a and 3b feed out sheets P from the sheet feed cassettes 2a and 2b to the first sheet conveyance passage 4a. The sheet feed device 3c feeds out sheets P from the manual sheet feed tray 2c to the first sheet conveyance passage 4a.

The sheet feed device 3a to 3c each have a pickup roller 18, a plurality of pair of conveyance rollers 22, and a feed sensor 30a to 30c. The pickup roller 18 rotates while in contact with the surface of a bundle of sheets P (i.e., the topmost one of the bundle of sheets P) placed on the sheet feed cassette 2a or 2b or the manual sheet feed tray 2c, and feeds out one sheet P in contact with it downstream in the sheet conveyance direction. The plurality of (here, two) pairs of conveyance rollers 22 are arranged side by side downstream of the pickup roller 18 with respect to the sheet conveyance direction. The pairs of conveyance rollers 22 convey the sheet P fed out by the pickup roller 18 to the first sheet conveyance passage 4a.

The feed sensor 30a to 30c may be an optical photosensor. The feed sensor 30a can detect the sheet P conveyed from the sheet feed cassette 2a. The feed sensor 30b can detect the sheet P conveyed from the sheet feed cassette 2b. The feed sensor 30c can detect the sheet P conveyed from the manual sheet feed tray 2c.

A pair of registration rollers 13 is provided in a downstream end part of the first sheet conveyance passage 4a with respect to the sheet conveyance direction. A first belt conveyance portion (conveyance portion) 5 and a recording portion (printing portion) 9 are disposed closely downstream of the pair of registration rollers 13. The pair of registration rollers 13 corrects skewed feeding of the sheet P and, in coordination with ink ejection operation by the recording portion 9, feeds the sheet P toward the first belt conveyance portion 5.

A pre-registration sensor 20, which detects the sheet P fed out from the sheet feed cassette 2a or the manual sheet feed tray 2c, is disposed closely upstream of the pair of registration rollers 13. Between the pair of registration rollers 13 and the first belt conveyance portion 5, a CIS (contact image sensor) 21, which detects the position of an end part of the sheet P in its width direction (perpendicular to the sheet conveyance direction), is disposed.

The first belt conveyance portion 5 includes an endless conveyance belt and a sheet suction portion. The sheet suction portion is provided at the inner side of the conveyance belt, to face the reverse side of the conveyance belt opposite from its conveyance surface. The sheet suction portion has a large number of holes for air suction formed in its top face, and includes a fan inside; it can thus such air through the top face down. The conveyance belt too has a large number of air holes for air suction formed in it. With this configuration, the sheet P fed out from the pair of registration rollers 13 is, in a state held by suction on the conveyance surface of the conveyance belt, passes under the recording portion 9.

The recording portion 9 includes line heads 11C, 11M, 11Y, and 11K, which record an image on the sheet P conveyed by the first belt conveyance portion 5. By ejecting ink sequentially from the line heads 11C to 11K toward the sheet P held by suction on the conveyance belt according to information on image data received from an external computer or the like, a full-color image having inks of four colors, namely cyan, magenta, yellow, and black, overlaid together is recorded on the sheet P. The printer 100 can also record a monochrome image.

The line heads 11C to 11K have a recording area wider than the width of the sheet P conveyed. A predetermined interval (for example, 1 mm) is formed between bottom end parts of the line heads 11C to 11K (ink ejection portion) and the conveyance surface of the first belt conveyance portion 5. The line heads 11C to 11K are movable in the up-down direction so that this interval can be changed.

The line heads 11C to 11K include recording heads (not illustrated), which are respectively fed with ink of whichever of four colors (cyan, magenta, yellow, and black) stored in ink containers 25C to 25K (see FIG. 2) correspond to the recording heads 11C to 11K.

Each line heads 11C to 11K can eject ink from ink ejection nozzles corresponding to the print position onto the sheet P conveyed by the first belt conveyance portion 5 according to image data received from the external computer or the like. As a result, a full-color image having ink of four colors, namely cyan, magenta, yellow, and black, overlaid together is formed on the sheet P.

A second belt conveyance portion 12 is disposed downstream (at the left side in FIG. 1) of the first belt conveyance portion 5 with respect to the sheet conveyance direction. The sheet P having the image recorded on it in the recording portion 9 is conveyed to the second belt conveyance portion 12 and, while it is passing through the second belt conveyance portion 12, the ink ejected on the surface of the sheet P is dried. The configuration of the second belt conveyance portion 12 is the same as that of the first belt conveyance portion 5.

A decurler portion 14 is provided downstream of the second belt conveyance portion 12 with respect to the sheet conveyance direction, close to the left side face of the printer main body 1. The sheet P having the ink dried in the second belt conveyance portion 12 is conveyed to the decurler 14, where the sheet P is decurled.

A second sheet conveyance passage 4b (conveyance portion) is provided downstream of (in FIG. 1 above) the decurler portion 14 with respect to the sheet conveyance direction. A pair of discharge rollers 31 (recording medium discharging portion), which discharges the sheet P out of the printer main body 1, is provided in a downstream end part of the second sheet conveyance passage 4b with respect to the sheet conveyance direction.

When duplex recording is not performed, the sheet P having passed through the decurler 14 is discharged from the second sheet conveyance passage 4b to a sheet discharge tray 15 provided on the left side face of the printer 100, outside it, via the pair of discharge rollers 31. When duplex recording is performed on the sheet P, the sheet P having undergone recording on one side and having passed through the second belt conveyance portion 12 and the decurler portion 14 passes through the second sheet conveyance passage 4b and is conveyed to a reversing conveyance passage 16.

The sheet P conveyed to the reversing conveyance passage 16 has its conveyance direction switched to reverse its obverse and reverse sides, and then passes over the upper part of the printer 100 to be conveyed to the pair of registration rollers 13. After that, the sheet P is conveyed, with its non-recorded side facing up, again to the first belt conveyance portion 5.

A discharge sensor 32 is disposed in the second sheet conveyance passage 4b, close to the pair of discharge rollers 31. The discharge sensor 32 can detect the sheet P discharged by the pair of discharge rollers 31. Specifically, the discharge sensor 32 is disposed downstream of the pair of discharge rollers 31 with respect to the sheet conveyance direction, and when the sheet P passes through the pair of discharge rollers 31, the discharge sensor 32 detects the sheet P. The discharge sensor 32 may be an optical photosensor.

A third sheet conveyance passage 4c (conveyance portion), which branches downward from the first sheet conveyance passage 4a is provided upstream of the pair of the registration rollers 13 with respect to the sheet conveyance direction. An escape tray 23 is provided in a downstream end part of the third sheet conveyance passage 4c. The escape tray 23 collects sheets P that are holed, dog-eared, or otherwise damaged (waste sheets) which are detected by the pre-registration sensor 20.

A maintenance unit 19 is disposed under the second belt conveyance portion 12. When the maintenance of the recording heads is performed, the maintenance unit 19 moves to under the recording portion 9, wipes off the ink flushed (purged) out of the ink ejection nozzles in the recording heads constituting the line heads 11C to 11K, and collects the ink wiped off.

FIG. 2 is a block diagram showing one example of control paths in the printer 100 according to the embodiment. As shown in FIG. 2, in addition to the components described above, the printer 100 further includes a control device 110, an operation panel 27 (input portion, display portion), a storage portion 28, and a communication portion 29.

The control device 110 is, for example, configured to include a CPU (central processing unit) and a memory. Specifically, the control device 110 includes a main-control portion 110a, a print completion time setting portion 110b, a sheet feed control portion 110c, a maintenance control portion 110d.

The main-control portion 110a controls the operation of the different portions of the printer 100. For example, the driving of the rollers inside the printer 100, the ejection of ink from the line heads 11C to 11K during image recording, and the like are controlled by the main-control portion 110a. The main-control portion 110a has a count portion for counting time and a time setting portion for setting a time (neither are illustrated) and stores the time count and the set time in the storage portion 28.

The print completion time setting portion 110b sets a theoretical print completion time when printing starts. The theoretical print completion time is calculated from: the print time based on the size information as to sheets P and the number of sheets to be printed that are entered on the operation panel 27 as will be described later; the maintenance time needed for calibration for density correction, flashing (missed ejection) for suppressing ink ejection failure in the line heads 11C to 11K, purging by the maintenance unit 19, and the like; and the user response time required for sheet replenishment, and switching of the sheet feed trays when multiple sheet feed cassettes 2a (and the manual sheet feed tray 2c) are provided.

The sheet feed control portion 110c controls the pair of registration rollers 13 and the sheet feed device 3a to 3b, For example, the sheet feed control portion 110c controls, by controlling the pair of registration rollers 13 based on the timing of detection of the trailing end of the sheet P by the CIS 21, the conveyance timing of the following sheet P.

The maintenance control portion 110d performs control to perform the above-mentioned purging by forcibly flushing ink out of the ink ejection nozzles in the recording heads constituting the line heads 11C to 11K. When making the recording heads perform purging, the maintenance control portion 110d controls the driving of the above-described maintenance unit 19 (for example, its movement and retraction to and from under the recording portion 9).

The operation panel 27 is an operation portion (input portion) for accepting input of various settings. For example, the user can input size information as to the sheets P set on the sheet feed cassette 2a and the manual sheet feed tray 2c by operating the operation panel 27. The user can also input the number of sheets P to be printed and enter an instruction to start a printing job by operating the operation panel 27. The operation panel 27 has a function as a notification device (display portion) for indicating the operation status of the printer 100.

The storage portion 28 is a memory which stores an operation program of the control device 110 as well as various kinds of information, and is configured to include a ROM (read-only memory), a RAM (random-access memory), a nonvolatile memory, and the like. Information set on the operation panel 27 is stored in the storage portion 28.

The storage portion 28 has a delay storage portion 24 and a conveyance time storage portion 26. The delay storage portion 24 stores information (hereinafter simply "delay information") on delays that occur during printing. Delay information includes events (hereinafter simply "delay factors") which cause delays during printing. Delay factors include switching of the sheet feed trays, switching of the head position, retrial of sheet feeding, communication errors, retrial of communication, and the like.

Switching of the sheet feed tray is an operation to switch the sheet feed source of the sheet P among the sheet feed cassettes 2a or 2b and the manual sheet feed tray 2c. Switching of the sheet feed tray is performed, for example, when the sheets P on the sheet feed source, namely the sheet feed cassettes 2a or 2b or the manual sheet feed tray 2c, run out, or when the type of sheets P is changed during printing. When the sheet feed tray switches, in order to change the driving state of the rollers in the sheet feed devices 3a to 3c, feeding of the sheet P is momentarily suspended. Thus, a delay occurs in printing when switching of the sheet feed tray occurs.

Switching of the head position is an operation to move the line heads 11C to 11K the height direction to change the distance between the head end of the line heads 11C to 11K and the surface of the sheet P. When the head position switches, in order to stop the ejection of ink printing is suspended. Thus, a delay occurs in printing when switching of the head position occurs.

Retrial of sheet feeding denotes performing sheet feeding again because the sheet feed device 3a to 3c cannot convey a sheet P from the sheet feed cassettes 2a or 2b or the manual sheet feed tray 2c in a single operation of sheet feeding. When retrial of sheet feeding occurs, a delay occurs in printing. Retrial of sheet feeding may occur due to the quality, surface condition, weight, arrangement position displacement, and the like of the sheet P. For this reason, occurrence of retrial of sheet feeding is difficult for the user to predict, and thus retrial of sheet feeding is included in irregular delay factors, which may occur irregularly.

Retrial of communication denotes trying communication again when a communication error occurs between the communication portion 29 (which will be described in detail later) in the printer 100 and a host device such as a PC due to some fault. When the printer 100 cannot receive the details of printing from the host device due to a communication error, printing cannot be performed. Even if the printer 100 has already received the details of the printing, if a change is made in the details of printing, it cannot cope with the change; thus printing may be momentarily suspended when retrial of communication occurs. That is, when retrial of communication occurs, a delay in printing may occur. A communication error may occur when wireless communication between the printer 100 and the host device (such as the PC) is poor, and thus occurrence of a communication error and of retrial of communication is difficult for the user to predict.

The conveyance time storage portion 26 stores an actual conveyance time. The actual conveyance time is the time actually required to convey the sheet P from the sheet feed timing at which the sheet P is fed out from the sheet feed cassettes 2a or 2b or the manual sheet feed tray 2c to the discharge timing at which the sheet P is discharged from the printer main body 1. Specifically, the main-control portion 110a can detect the timing (sheet feed timing) at which the sheet P is fed out from the sheet feed cassettes 2a or 2b or the manual sheet feed tray 2c based on the detection result from the sheet feed sensors 30a to 30c. The main-control portion 110a can detect the timing (discharge timing) at which the sheet P is discharged from the printer main body 1 based on the detection result from the discharge sensor 32. The main-control portion 110a calculates the actual conveyance time from the detection results as to the sheet feed timing and the discharge timing, and stores it in the conveyance time storage portion 26.

In the conveyance time storage portion 26, a reference conveyance time is stored in advance. The reference conveyance time is the time required from the sheet feed timing to the discharge timing under a condition with no delay in printing. The reference conveyance time is preset in the conveyance time storage portion 26. The main-control portion 110a can calculate the duration (delay duration) of a delay that occurs during printing from the difference value between the actual conveyance time and the reference conveyance time. The delay duration is stored in the conveyance time storage portion 26.

In the delay storage portion 24, predetermined factors among delay factors are stored as irregular delay factors. An irregular delay factor is a delay factor which is difficult for the user to predict and may occur irregularly. For example, as described above, retrial of sheet feeding, communication errors, and retrial of communication are difficult for the user to predict and are included in irregular delay factors. The settings as to irregular delay factors can be changed by operation on the operation panel 27 and through input from the host device such as the PC. That is, it is possible to include or exclude delay factors other than retrial of sheet feeding and retrial of communication (that is, switching of the sheet feed tray, switching of the head position, and other delay factors) in or from irregular delay factors.

For example, if printing is started without a check on the number of sheets P remaining on the sheet feed cassettes 2a or 2b or the manual sheet feed tray 2c, it may be difficult to predict occurrence of switching of the sheet feed tray during printing. For this reason, settings may be made such that switching of the sheet feed tray is included in irregular delay factors.

The main-control portion 110a can run a measurement mode. Instructions to start and end the measurement mode are entered on the operation panel 27. If delay factors arise in the measurement mode, the main-control portion 110a stores information (delay information) on those delay factors in the delay storage portion 24. The delay information includes delay factors, delay durations, and delay occurrence times. When an instruction to end the main-control portion 110a is entered, out of the delay information stored in the recording portion 28, delay information related to irregular delay factors is displayed on the operation panel 27.

The measurement mode can be started at the start or in the middle of printing and can be ended in the middle or at the end of printing. Settings may be made in advance such that the measurement mode is performed during a predetermined time span. An example of controlling the measurement mode will be described in detail later.

The control portion 29 is a communication interface for transmitting and receiving information to and from an external device (for example, a personal computer (PC)). For example, when the user operates the PC to transmit image data along with a print command to the printer 100, the image data and the print command are input to the printer 100 via the communication portion 29. In the printer 100, the main-control portion 110a can record image to the sheet P by controlling the recording heads 17a to 17c to eject ink based on the above-mentioned image data.

Next, an example of controlling the measurement mode will be described with reference to the flow chart in FIG. 3. FIG. 3 is a flow chart showing one example of a control flow for the measurement mode.

As shown in FIG. 3, the main-control portion 110a checks whether an image formation command is entered from the host device such as the PC (step S1), If no image formation command is entered (No in step S1), a standby state waiting for image formation is continued until an image formation command is entered.

If an image forming command is entered (Yes in step S1). the main-control portion 110a starts image formation and checks whether an instruction to perform the measurement mode is entered (step S2). If no instruction to perform the measurement mode is entered (No in step S2), the standby state waiting for the measurement mode is continued until an instruction to perform the measurement mode is entered.

If an instruction to perform the measurement mode is entered (Yes in step S2), the delay information stored in the delay storage portion 24 is deleted (step S3). Next, it is checked whether a delay factor has occurred during image formation (step S4). If a delay factor has occurred (Yes in step S4), delay information (information including delay factor, delay duration, and delay occurrence time) on that delay factor is stored in the delay storage portion 24 (step S5). If no delay factor has occurred (No in step S4), the control flow skips step S5 and proceeds to step S6.

Next, it is checked whether an instruction to end the measurement mode is entered (step S6). If an instruction to end the measurement mode is entered (Yes in step S6), out of the delay information stored in the delay recording portion 24, delay information related to any irregular delay factor is displayed on the operation panel 27 (step S7) and the measurement mode is ended. If no instruction to end the measurement mode is entered (No in step S6), the control flow returns to step S4 and repeats steps S4 through S6 until an instruction to end the measurement mode is entered.

When delay information is stored repeatedly from step S4 through step S6, the delay information is stored cumulatively on top of the delay information already stored. Specifically, after the delay duration included in the delay information is stored in step S5, if no instruction to end the measurement mode is entered (No in step S6) and a delay duration related to another delay factor is stored in step S5, the main-control portion 110a calculates the cumulative time by adding the delay duration that has occurred later to the previously stored delay duration and stores that cumulative time in the delay storing portion 24.

As described above, by running the measurement mode, it is possible to display on the operation panel 27 delay information related to irregular delay factors that have occurred during the measurement mode. Thus, even if irregular delay factors occur, the user can resolve the irregular delay factors by referring to the delay information displayed on the operation panel 27. Thus, it is possible to provide a printer 100 which can suppress a drop in printing efficiency.

When using the printer 100 as what is called a business-use printer for printing several thousand sheets in a single session of printing, the user who operates the printer 100 is often a knowledgeable expert of printing. Such users can often predict common delay factors, such as switching of the sheet feed trays or switching of the head position, in advance from the details of printing. For this reason, when a delay occurs in printing, even if delay information related to such common delay factors is displayed on the operation panel 27, it may be of little value, of the kind already predicted. By contrast, irregular delay factors like those mentioned above, including retrial of sheet feeding or retrial of communication, are difficult to predict in advance even if the user is an expert. Thus, when a delay occurs in printing due to irregular delay factors, by displaying delay information related to irregular delay factors on the operation panel 27, it is possible to indicate delay information that is useful even for the expert user.

As mentioned above, irregular delay factors include retrial of sheet feeding. Occurrence of retrial of sheet feeding is difficult to grasp in advance, and thus, with the known printer 100, which reads delay information in advance from the details of printing received from the host device and displays it on the display portion, it is difficult to display delay in printing due to retrial of sheet feeding. In contrast, with the printer 100 according to the above embodiment, if retrial of sheet feeding occurs during the measurement mode, delay information about retrial of sheet feeding is stored in the delay storage portion 24, and after the end of the measurement mode, delay information related to irregular delay factors including retrial of sheet feeding is displayed on the operation panel 27. Thus, the user can grasp occurrence of retrial of sheet feeding. Accordingly, the user can perform maintenance such as cleaning of the sheet feed devices 3a to 3c to suppress occurrence of retrial of sheet feeding.

As mentioned above, irregular delay factors also include communication errors and retrial of communication. For this reason, also if a communication error occurs during the measurement mode, the printer 100 according to the above embodiment can display delay information related to the communication error or retrial of communication on the operation panel 27. Thus, by performing the measurement mode, the user can grasp occurrence of a communication error or retrial of communication, and can suppress occurrence of retrial of communication by adjusting the communication environment and communication settings between the primer 100 and the host device such as the PC.

As described above, delay information includes delay durations as mentioned above and can store delay durations cumulatively in the delay storage portion 24. Thus, when delay factors repeatedly occur during the measurement mode, it is possible to display the total value of the delay durations due to those delay factors on the operation panel 27.

As described above, the printer 100 according to the above embodiment can calculate the delay duration of a delay that actually occurs during printing from the difference value between the actual conveyance time during the measurement mode and the reference conveyance time. Thus, it is possible to calculate a more accurate delay duration and display it on the operation panel 27.

As mentioned above, delay information includes delay occurrence times. Thus, it is possible to grasp the timing of occurrence of irregular delay factors. Delay information includes the number of times of occurrences of delay factors. Thus, the user can grasp the frequency of occurrence of irregular delay factors.

For the delay duration stored in the delay storage portion 24, it is possible to include in it the waiting time required when printing is momentarily stopped during printing and the user performs maintenance or the like.

The delay information displayed on the operation panel 27 when an instruction to end the measurement mode is entered can be configured to display only delay information related to irregular delay factors and no delay information related to other delay factors. In this way, delay information which is useless to the user who is an expert is not displayed and only delay information related to irregular delay factors which is useful can be indicated to the user. Thus, it is possible to resolve delay factors efficiently.

The scope of the present disclosure is not limited to the above embodiments and thus encompasses any modifications made without departure from the spirit of the present disclosure. For example, while the above embodiment deals with, as an example, an inkjet recording printer 100 which performs recording by ejecting ink from line heads 11C to 11K provided in a recording portion 9, the present disclosure can be applied also to image forming apparatuses such as electrophotographic printers, copiers, digital multifunction peripherals, and facsimile machines.

The present disclosure can be applied an image forming apparatus which forms an image on a recording medium by an inkjet recording method or an electrophotographic method. According to the present disclosure, it is possible to provide an image forming apparatus on which, even if a delay factor that occurs during printing is one that occurs irregularly (an irregular delay factor), it is possible to indicate the delay factor to the user.

What is claimed is:

1. An image forming apparatus comprising:
a conveyance portion that conveys a recording medium;
a printing portion that performs printing on the recording medium conveyed by the conveyance portion;
a delay storage portion that can store delay information including a delay factor which causes a delay during printing;
a control portion that performs a measurement mode to store the delay information in the delay storage portion when the delay factor occurs;
an input portion through which instructions to start and end the measurement mode are entered; and
a display portion that displays the delay information, wherein
when an instruction to perform the measurement mode is entered, the control portion deletes the delay information stored in the delay storage portion and stores the delay information generated thereafter during printing in the delay storage portion, and
when an instruction to end the measurement mode is entered, the control portion displays on the display portion the delay information on a predetermined irregular delay factor that occurs irregularly during printing, out of the delay information stored in the delay storage portion.

2. The image forming apparatus according to claim 1, further comprising:
a storing portion that stores the recording medium; and
a recording medium feeding portion that feeds the recording medium from the storing portion to the conveyance portion,
wherein
when a fault occurs in feeding of the recording medium from the storing portion to the conveyance portion, the control portion can stop sheet feeding by the recording medium feeding portion and thereafter perform retrial of sheet feeding to restart the sheet feeding, and
the irregular delay factor includes retrial of sheet feeding.

3. The image forming apparatus according to claim 1, wherein
the irregular delay factor includes a communication error that occurs between the display portion, input portion, or the recording storage portion and the control portion.

4. The image forming apparatus according to claim 1, wherein
when the delay factor occurs during the measurement mode, the control portion stores a delay duration cumulatively in the delay storage portion, and the delay information includes a cumulative delay duration which is a cumulative value of the delay duration.

5. The image forming apparatus according to claim 4, further comprising:
   a recording medium discharging portion that discharges the recording medium printed by the printing portion;
   a sheet feed sensor provided in the recording medium feeding portion, the sheet feed sensor detecting a sheet feed timing at which the recording medium is ted from the storing portion to the conveyance portion;
   a discharging sensor provided in the discharging portion, the discharging sensor detecting a discharging timing at which the recording medium is discharged; and
   a conveyance time storage portion that stores a reference conveyance time which is a time required from the sheet feed timing to the discharge timing under a condition with no delay in printing,
   wherein
   the control portion can calculate the delay duration during printing from a difference value between an actual conveyance time, which is calculated from a time difference between the sheet feed timing and the discharge timing, and the reference conveyance time.

6. The image forming apparatus according to claim 1, wherein
   the control portion stores a delay occurrence time, which is an occurrence time of the irregular delay factor that occurs during the measurement mode, in the delay storage portion; and
   the delay information includes the delay occurrence time.

7. The image forming apparatus according to claim 1, wherein
   the delay information includes a number of times of occurrences of the delay factor.

* * * * *